O. ECKBERG.
ANTIRATTLER FOR VEHICLE TOPS.
APPLICATION FILED DEC. 2, 1911.

1,047,184.

Patented Dec. 17, 1912.

Witnesses

Inventor
Oscar Eckberg
By Luther V. Moulton
Attorney

UNITED STATES PATENT OFFICE.

OSCAR ECKBERG, OF GRAND RAPIDS, MICHIGAN.

ANTIRATTLER FOR VEHICLE-TOPS.

1,047,184.  Specification of Letters Patent.  Patented Dec. 17, 1912.

Application filed December 2, 1911. Serial No. 663,564.

*To all whom it may concern:*

Be it known that I, OSCAR ECKBERG, a citizen of the United States of America, residing at Grand Rapids, in the county of Kent and State of Michigan, have invented certain new and useful Improvements in Antirattlers for Vehicle-Tops; and I do hereby declare the following to be a full, clear, and exact description of the invention, such as will enable others skilled in the art to which it appertains to make and use the same.

My invention relates to improvements in anti-rattlers for vehicle tops and the like and its object is to provide a separable hinge joint with means for preventing rattling; to provide a device simple in construction and effective in operation and to provide the same with various new and useful features as hereinafter more fully described and particularly pointed out in the claims.

It is a common practice to provide the bows of vehicle tops with separable hinge connections at the point where they are attached to the body of the vehicle and in the case where an exceedingly long top is used such as on double seated vehicles and the like it is necessary to use a double set of bows. The forward set must be provided with a hinge connection to the body which may be readily detached so that the top may be folded behind the rear seat. These hinge joints have heretofore given much annoyance because of the looseness of their connections which allows them to vibrate and rattle with the jar of the vehicle.

It is the object of my invention to overcome this objectionable feature by using a spring actuated sleeve which surrounds the hinge stud and yieldably engages the body bracket and automatically takes up any looseness there may be in the joint thereby preventing its vibration. It is also desirable to wholly inclose the spring, whereby a neat and smooth finish is provided and dust excluded from the spring and joint.

Figure 1:
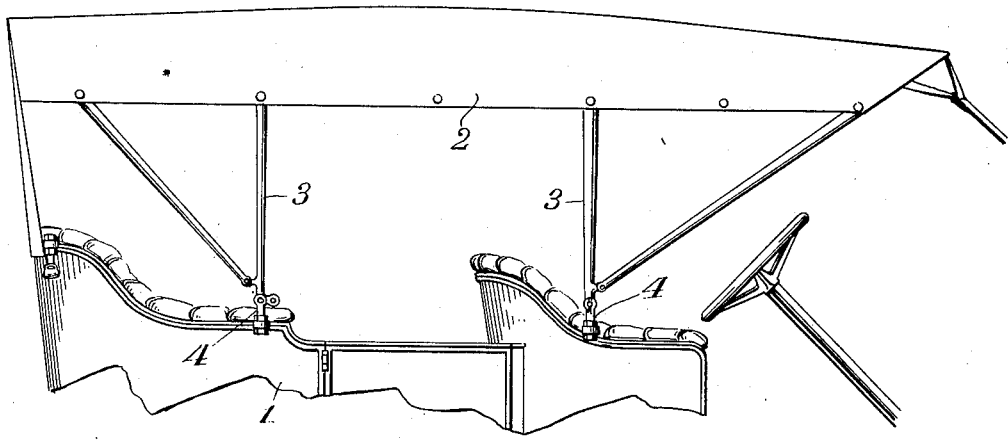
Figures 2, 3, 4:
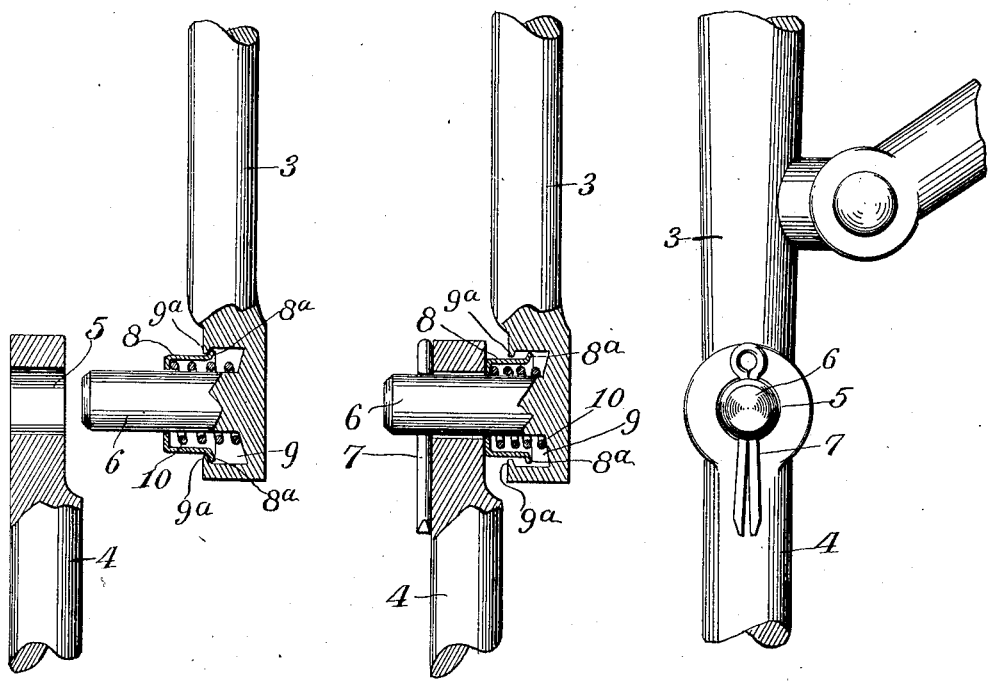

The construction and arrangement of my device is clearly illustrated in the accompanying drawings, in which:

Figure 1 is an elevation of a portion of a vehicle with a top thereon showing the location of the joints to which my anti-rattling device is attached; Fig. 2 is an elevation partially in section of the essential parts of the joint in disassembled position; Fig. 3 is the same showing the joint assembled; and Fig. 4 is a side elevation of the assembled joint.

Like numbers refer to like parts in all of the figures.

1 represents the vehicle body which is covered by the top 2 supported by bows 3 which bows are attached to the body and carried upon brackets 4. These brackets are provided with openings or eyes 5 to receive studs 6 which project at right angles from the respective lower ends of the bows 3. After being inserted through the eye each stud is prevented from being withdrawn by inserting a cotter pin 7 or the like through an opening near its end. It is not expedient to make these joints close fitting as they must be frequently disassembled hence the looseness in the joint must be taken up in some way to prevent rattling.

I have provided a sleeve 8 surrounding the stud 6 and extending into an annular recess 9 in the end of the bow at the base of the stud and slidable therein forming a closed telescopic casing for the spring. The inner end of this sleeve is flanged outward as at $8^a$ and engages an inturned flange $9^a$ at the mouth of the annular recess 9 which prevents the sleeve from being removed from the stud 6. To assemble the device, the flange $9^a$ is first formed to project outward and having an opening to permit the flange $8^a$ to pass therethrough then the flange $9^a$ is turned inward by any well known means, such as a die or punch, or by spinning, or the sleeve 8 may be made straight and thus inserted in place and its edge turned outward to form the flange $8^a$ by forcing it against the conical bottom of the recess 9. This sleeve 8 is yieldingly thrust outward by means of a spring 10 which surrounds the pin and engages the sleeve at one end and seats against the bottom of the recess 9 at the other end. When the joint is assembled the outer face of the sleeve 8 engages the face of the bracket and is partially receded within the opening 9 compressing the spring 10, which draws the cotter pin 7 tightly against the face of the bracket and holds the joint snugly in place. It will be clearly seen that in this construction the before-mentioned disadvantages are overcome, the spring wholly inclosed and dust excluded. This device is simple and cheaply made and there are no loose parts to be misplaced.

What I claim is:—

1. An anti-rattler for vehicle tops, comprising a bow having a stud projecting from the lower end and an annular recess surrounding the stud, a bracket having an eye to receive the stud, means for detachably securing the stud in said eye, a casing surrounding the stud slidable on the stud in the outer end and slidable within the recess at the inner end, a spring within the casing and recess and yieldably forcing the casing outward against the bracket, and means for retaining the casing within the recess.

2. An anti-rattler for vehicle tops, comprising a bow, a stud projecting at right angles from the lower end of the bow, a bracket rigidly attached to the body of the vehicle and having an eye in its upper end to receive the stud, means for retaining the stud within the eye, an annular recess in the bow at the base of the stud having an inturned flange at its mouth, a sleeve surrounding the stud and extending into the annular recess and also having its inner end flanged outward to engage the flange at the mouth of the recess and a spring within the sleeve to yieldingly thrust said sleeve outward on the stud.

In testimony whereof I affix my signature in presence of two witnesses.

OSCAR ECKBERG.

Witnesses:
HAROLD O. VAN ANTWERP,
LUTHER V. MOULTON.

---

Copies of this patent may be obtained for five cents each, by addressing the "Commissioner of Patents, Washington, D. C."